United States Patent [19]

Pfalzer et al.

[11] 4,277,328

[45] Jul. 7, 1981

[54] FLOTATION APPARATUS FOR SEPARATING IMPURITIES FROM A FIBER SUSPENSION

[75] Inventors: Lothar Pfalzer; Siegbert Fischer, both of Heidenheim, Fed. Rep. of Germany

[73] Assignee: J.M. Voith GmbH, Fed. Rep. of Germany

[21] Appl. No.: 123,013

[22] Filed: Feb. 20, 1980

[30] Foreign Application Priority Data

Feb. 21, 1979 [DE] Fed. Rep. of Germany ....... 2906599

[51] Int. Cl.³ .............................................. B03D 1/20
[52] U.S. Cl. ..................................... 209/169; 261/87; 210/221.1
[58] Field of Search ............................... 209/168–170; 210/221 P, 221 M; 261/121 R, 87; 162/4

[56] References Cited

U.S. PATENT DOCUMENTS

| | | | |
|---|---|---|---|
| 2,061,564 | 11/1936 | Drake et al. | 209/168 |
| 3,050,188 | 8/1962 | Nisser et al. | 209/170 |
| 3,070,229 | 12/1962 | Benozzo | 209/170 X |
| 4,028,229 | 6/1977 | Dell | 209/170 X |
| 4,078,026 | 3/1978 | Fallenius | 210/221 P X |

Primary Examiner—William A. Cuchlinski, Jr.
Attorney, Agent, or Firm—Ostrolenk, Faber, Gerb & Soffen

[57] ABSTRACT

The invention concerns a flotation apparatus for separating impurities, such as printing ink, or the like, from a fiber suspension that has been formed from waste paper. The apparatus includes a container for flotation of the suspension. A drive shaft extends into the container, either from above or below. A feed opening for suspension is defined at the bottom of the container. On the drive shaft is a pump impeller for impelling suspension into the container and downstream along the drive shaft. From the pump impeller there is a rotor located on the drive shaft for dispersing air that is introduced to the container by an air feed conduit which emits air into the region of the rotor. The drive shaft itself may serve as the air feed conduit and it may have air outlets at either or both of the pump impeller and the rotor. A foam withdrawal means for withdrawing the foam of impurities generated in the flotation apparatus has an inlet positioned at the axis of the cylinder which is at the axis of the rotor.

24 Claims, 3 Drawing Figures

FLOTATION APPARATUS FOR SEPARATING IMPURITIES FROM A FIBER SUSPENSION

BACKGROUND OF THE INVENTION

This invention relates to a flotation apparatus for removing printing ink, or the like impuritie, from a fiber suspension that was produced from waste paper. The flotation apparatus is positioned within a container which has a feed opening for the suspension that is to be floated in the lower portion of the container, a pump impeller arranged on a drive shaft, and an air-feed conduit.

Printing ink, and the like impurities, are removed from a waste-paper fiber suspension by mixing fine bubbles of air into the suspension. The detached particles of ink and dirt adhere to the surfaces of the bubbles. These air bubbles rise together with the particles of ink and fine particles of dirt adhering to them and can be removed from the suspension as foam on the surface. By the addition of flotation chemicals, such as sodium soap which is converted by the hardness of the water into potassium soap, the flotation effect is increased.

A pump impeller is generally employed for feeding the suspension which is to be floated. Since the air bubbles in the suspension should be in as finely divided a state as possible, the pump impeller has been used at the same time to disperse the air that is introduced via an air-feed conduit. At the same time, intimate mixing of the suspension with the air is obtained. Particularly in large apparatus, this has the disadvantage that the simultaneous transport of air and dispersal of the air bubbles disturbs the drawing-in of the suspension. Due to the admixture of air, the conveying action of the pump impeller is impaired. Accordingly, a compromise between the conveyor performance and the dispersing of the air which is blown in is required.

SUMMARY OF THE INVENTION

The object of the present invention is to provide a flotation apparatus for removing printing ink, and the like impurities, from a fiber suspension formed from waste paper.

Another object of the invention is to provide such an apparatus in which a high rate of flow can be obtained with, at the same time, good dispersal of the air being blown in.

To achieve this object, according to the invention, (a) a rotor for dispersing the air that was introduced is arranged on the drive shaft downstream of the pump impeller in the direction of flow of suspension; (b) the air outlet openings of the air feed conduit are arranged in the region of the rotor; and (c) the feed opening for suspension from the bottom of the container discharges in the region of the pump impeller.

Instead of a single impeller performing both purposes, two units, which are respectively adapted to specific requirements, are present in accordance with the invention. By arranging the pump impeller and the rotor on the same drive shaft, only an insignificant increase in cost of the apparatus results. The air is introduced in the region of the rotor so that the pump impeller is not disturbed by the air. Thus, the pump impeller can effectively pump the suspension.

From DE-OS 27 03 183, the provision of two impeller units on a drive shaft is, in principle, already known. This device, however, serves only for mixing and dispersing of liquid or paste media containing several components.

It is already known that zones of high vacuum or rapidly changing pressure (for instance, in a despecking apparatus) improve separation of printing ink from the fibers in a suspension. With the invention, this effect can also be obtained if a certain amount of cavitation on the pump impeller is permitted by a corresponding development of the blades. With the previous single air dispersing and suspension pumping impeller, this effect could not be obtained.

It is contemplated that the container of the invention be substantially of a vertical cylindrical shape. This produces an eddy flow within the container, which causes the foam with the particles of printing ink to collect in the region of the longitudinal axis of the container and the axis of the rotor.

One further feature of the invention comprises developing the drive shaft as a hollow shaft the inside of which is developed as an air-feed conduit. This enables the required air to be blown into the container in a simple fashion.

It is advantageous in this connection for the rotor to be provided with air outlet openings. Furthermore, good air dispersal is obtained if the rotor is surrounded by baffle plates.

It is also beneficial for the blades of the pump impeller to have radial air outlet openings and for baffle plates to be arranged around the pump impeller. The air which emerges at the pump impeller can thus be fed to the rotor from below. As a result of this, the rotor has an even better action. For the pump impeller, an axial impeller can be used in accordance with the invention.

A good eddy flow, and thus good separation of the foam, is obtained if the rotor is provided in the region of the axis of the rotor with a sleeve which is open toward the inside of the container. The sleeve acts as an eddy promoter.

The foam supporting action is further improved in a container of closed construction when a foam removal tube is arranged in the central region of the container and is connected to a vacuum generator. The foam, together with the particles of printing ink, is drawn off in this way. The separation of the foam is improved if the foam withdrawal tube is arranged coaxial to the axis of the cylinder and dips into the cylinder.

If the drive shaft is introduced into the container from above, it is advantageous for the foam withdrawal tube to be arranged coaxially around the drive shaft.

Since the eddy core extends upward and the foam also moves upward, it is advantageous for the drive shaft to be introduced from above into the container and for the foam removal tube to be arranged coaxially around the drive shaft and to extend approximately half-way into the container. In this way, even foam which has not been withdrawn via the lower open end of the foam withdrawal tube is removed.

Other objects and features of the invention are explained below with reference to the accompanying drawings.

DESCRIPTION OF THE PREFERRED EMBODIMENTS

Figure 1:
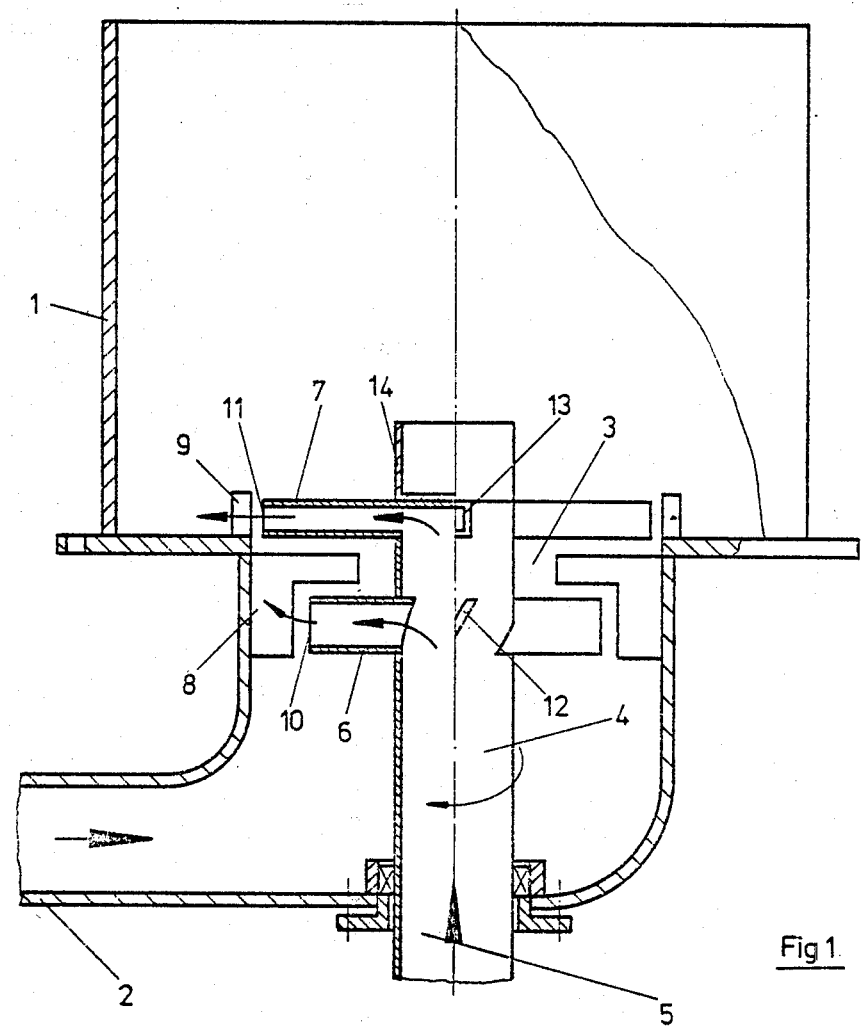
FIG. 1 is a longitudinal sectional view through the lower part of a flotation apparatus according to the invention.

The flotation apparatus of the invention has a cylindrical container 1 with a vertical axis. A feed conduit 2 leads into the bottom of the container. Through this, the suspension which is to be floated enters the container 1 from below via a feed opening 3.

Vertical drive shaft 4 is arranged in the feed conduit 2. The drive shaft 4 is developed as a hollow shaft and also serves as the air-feed conduit 5. On the drive shaft 4, an axial pump impeller 6 is attached. Downstream of the impeller 6, as seen in the direction of flow of suspension, there is a rotor 7. Baffle plates 8 and 9 are arranged around the pump impeller 6 and around the rotor 7 in order to disperse the air. The axial impeller 6 and the rotor 7 are provided with radially outwardly directed air-outlet openings 10 and 11. The axial impeller 6 is optimally designed in order to draw-in the suspension and is for this purpose provided with oblique vanes 12, which are inclined to the axis of the rotor. The rotor 7 has blades 13 of rectangular cross-sectional shape, and it is optimally designed for good dispersal of the inflowing air.

By means of the rotor 7, an eddy flow is produced within the container 1. This current is further reinforced by an eddy promotor 14 on the hub of the rotor 7.

Figure 2:
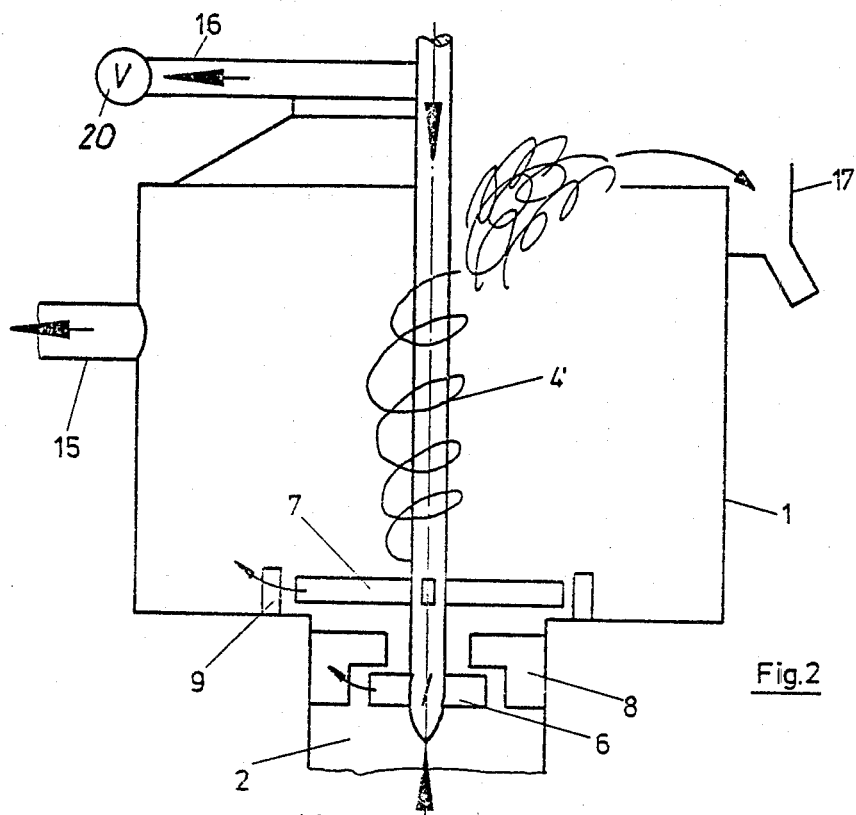
FIG. 2 schematically shows the principle of two different flotation apparatus.

FIG. 2 shows two embodiments for removal of the ink-laden foam from the suspension and for the discharge of the cleaned pulp. In its lower region, the flotation apparatus has the same construction as the embodiment described in connection with FIG. 1. The only significant difference is that the drive shaft 4' is introduced vertically into the container 1 from above. In the left-hand half of FIG. 2, a closed container is shown. In this case, the cleaned fiber suspension is removed from the container at the circumferential wall through a tangential outlet 15. For removal of the foam of impurities, the foam removal tube 16 is arranged at the tip of the conically tapering container in the central region thereof. The foam removal tube can, if necessary, be connected to a vacuum generator 20. Feeding of air into the container is also effected through the drive shaft 4', developed as a hollow shaft, to the rotor 7 and possibly to the pump impeller 6.

In the right-hand half of FIG. 2, there is shown an open-type flotation apparatus. In this case, the cleaned fiber suspension is withdrawn over an overflow weir 17.

Figure 3:
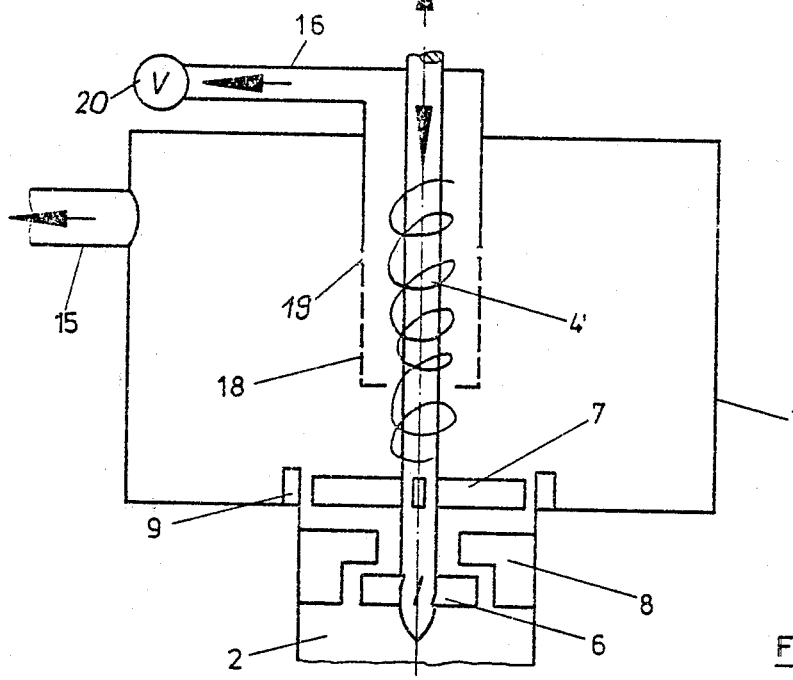
FIG. 3 schematically shows another embodiment of a flotation apparatus.

FIG. 3 shows a flotation apparatus of substantially the same construction. The only difference from the example indicated above is that the foam withdrawal tube 18 is arranged somewhat more than half-way into the container 1. Furthermore, the foam withdrawal tube is provided with a plurality of holes 19 in the tube wall. Due to the centrifugal action, the foam collects in the eddy core and in this way can be withdrawn, possibly supported by a vacuum generator 20, from the region of the axis of the container. Instead of the coaxial arrangement of the foam withdrawal tube 18 around the drive shaft 4', the tube 18 can also be arranged by itself in the center of the container and the drive shaft will extend from below into the container, corresponding to the arrangement shown in FIG. 1.

Although the present invention has been described in connnection with preferred embodiments thereof, many variations and modifications will now become apparent to those skilled in the art. It is preferred, therefore, that the present invention be limited not by the specific disclosure herein, but only by the appended claims.

What is claimed is:

1. Flotation apparatus for removing ink, or the like, from a fiber suspension formed from waste paper, the apparatus comprising:
   - a container in which the fiber suspension is to be floated; the container having a lower region;
   - a drive shaft; a pump impeller on the drive shaft for pumping suspension from the lower region of the container;
   - a feed opening for the suspension located in the lower regin of the container and discharging from the lower region of the container into the region of the pump impeller in the container;
   - an air feed conduit into the container; the air feed conduit having an outlet therefrom;
   - a rotor on the drive shaft for dispersing the air introduced into the container by the air feed conduit; the rotor being located downstream of the impeller along the drive shaft in the direction of flow of suspension into the container; the air feed conduit outlet being in the region of the rotor.

2. The flotation apparatus of claim 1, wherein the drive shaft extends into the container from below the container.

3. The flotation apparatus of claim 2, wherein the drive shaft is a hollow shaft which serves as the air feed conduit.

4. The flotation apparatus of claim 1, wherein the drive shaft is a hollow shaft which serves as the air feed conduit.

5. The flotation apparatus of either of claims 1 or 4, wherein the air outlet of the air feed conduit is in the rotor for permitting air to exit from within the rotor.

6. The flotation apparatus of claim 5, further comprising baffle plates surrounding the rotor.

7. The flotation apparatus of claim 5, wherein the pump impeller comprises a plurality of blades.

8. The flotation apparatus of claim 7, wherein the blades have at least part of the air conduit air outlet defined therein.

9. The flotation apparatus of claim 8, further comprising baffle plates arrayed annularly around the pump impeller.

10. The flotation apparatus of claim 7, wherein the impeller is an axial impeller.

11. The flotation apparatus of claim 7, wherein the rotor includes an open sleeve directed toward the inside of the container, in the region of the axis of the rotor; the sleeve serving as an eddy promoter.

12. The flotation apparatus of claim 1, wherein the rotor includes an open sleeve directed toward the inside of the container, in the region of the axis of the rotor; the sleeve serving as an eddy promoter.

13. The flotation apparatus of claim 1, wherein the container is generally a vertical cylinder.

14. The flotation apparatus of either of claims 1 or 13, wherein the container is closed; foam withdrawal means extending into the closed container, generally toward the center of the container.

15. The flotation apparatus of claim 14, wherein the foam withdrawal means is positioned to withdraw foam generally at the axis of the rotor.

16. The flotation apparatus of claim 15, wherein the foam withdrawal means extends into the container.

17. The flotation apparatus of claim 16, wherein the foam withdrawal means comprises a foam withdrawal tube extending into the container with an inlet generally at the axis of the rotor and comprises a vacuum generator connected with the tube for drawing foam into the tube inlet.

18. The flotation apparatus of claim 17, wherein the drive shaft extends into the container from above; the foam withdrawal tube being coaxially arranged around the drive shaft.

19. The flotation apparatus of claim 18, wherein the foam withdrawal tube has a plurality of holes distributed over its length, and the holes in the tube serve as the inlet thereto.

20. The flotation apparatus of claim 17, wherein the foam withdrawal tube has a plurality of holes distributed over its length and the holes in the tube serve as the inlet thereto.

21. The flotation apparatus of either of claims 1 or 13, wherein the foam withdrawal means comprises a foam withdrawal tube extending into the container and having an inlet in the container; the foam withdrawal tube being connected with a vacuum generator for drawing foam into the tube inlet.

22. The flotation apparatus of claim 21, wherein the drive shaft extends into the container from above; the foam withdrawal tube being coaxially arranged around the drive shaft.

23. The flotation apparatus of claim 22, wherein the foam withdrawal tube extends approximately half-way into the container.

24. The flotation apparatus of claim 21, wherein the foam withdrawal tube has a plurality of holes distributed over its length and the holes in the tube serve as the inlet thereto.

* * * * *